June 7, 1960     K. JONES ET AL     2,939,900
ELECTRIC BATTERIES
Filed March 22, 1957                     2 Sheets-Sheet 1
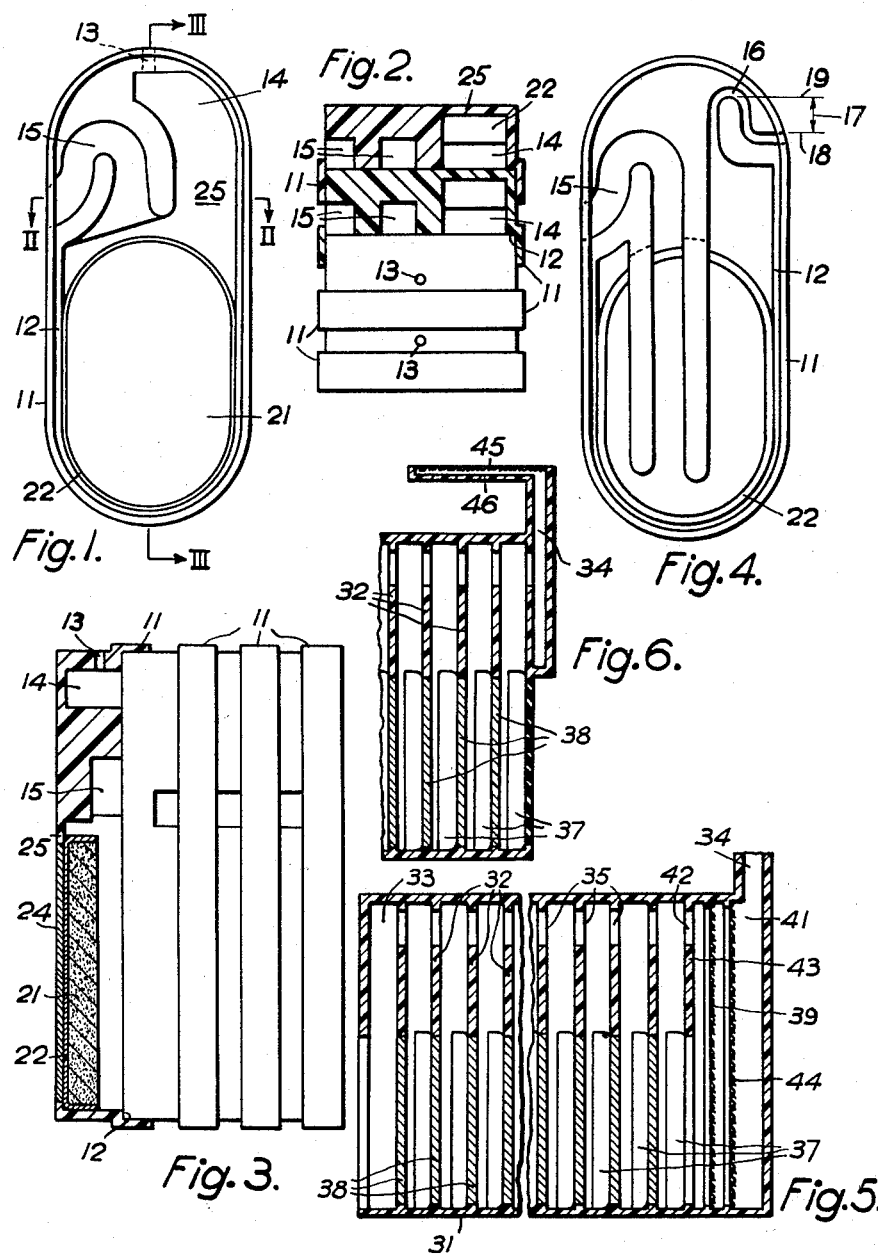
INVENTORS
Kenneth Jones & Jeanette
Elliot Godfrey
BY
ATTORNEY

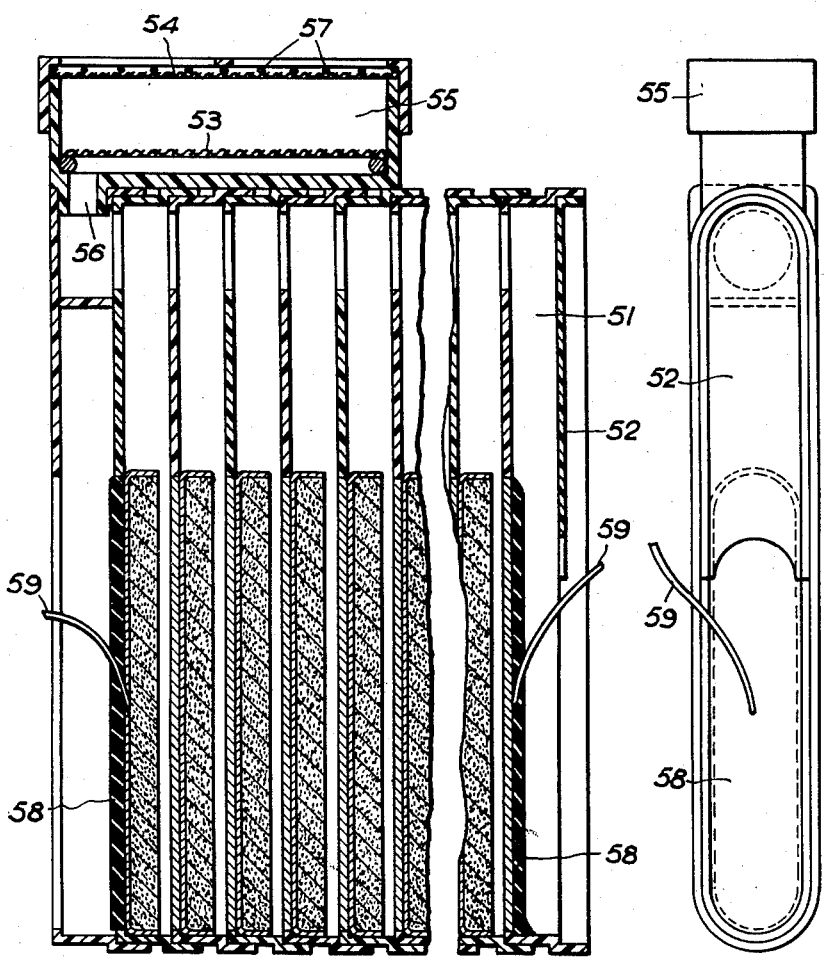

United States Patent Office 2,939,900
Patented June 7, 1960

2,939,900

ELECTRIC BATTERIES

Kenneth Jones and Jeannette E. Godfrey, both of Burndept Works, Kinnoull Road, W. Kingsway, Dundee, Scotland Filed Mar. 22, 1957, Ser. No. 655,934

Claims priority, application Great Britain Mar. 27, 1956

14 Claims. (Cl. 136—91)

This invention relates to electric batteries and in particular to batteries of the kind which may be stored dry and free of electrolyte and which when required for use are totally immersed in electrolyte. Such batteries are particularly useful where wholly automatic operation of a battery actuated device is desired or where a battery is required for emergency use especially at sea.

Where such batteries are required to provide a voltage which necessitates the use of a plurality of cells in series however, difficulties arise because the cells must be vented both to allow the cells to fill with electrolyte and to allow any gas formed in the cell to escape, but then communication is set up between the electrolyte in separate cells through the external bath of electrolyte, resulting in leakage current and the wasteful consumption of the electrodes.

One object of the invention is to provide a container construction which avoids, or at any rate, much reduces inter-communication between the electrolyte of different cells.

In embodying the invention, it is possible to make the necessary provision to avoid or reduce inter-communication in every cell, or a single inlet and outlet may be provided for a whole battery, the container itself then incorporating the necessary provision for forming the individual cells, allowing them to be filled with electrolyte and thereafter preventing communication between the electrolyte in one cell and that in another.

According to the invention, the container is provided with two vents, one to act as an inlet and the other to act as an outlet and each being constructed or arranged so that when a cell incorporating the container is wholly immersed in electrolyte the container will at least partially fill with electrolyte and the vents will be closed so that the electrolyte inside the container will be substantially isolated from the electrolyte outside the container. Such a construction is suitable where there is a separate container for each cell. If it is to be modified to constitute a container for a whole battery, it is provided with walls sub-dividing it into a plurality of individual cells, the cells being inter-connected by apertures in the dividing walls located in a headspace above the space for the active materials and connections in the cells, the headspace becoming initially filled with electrolyte when the container is immersed, but this electrolyte is displaced by gas. If the battery system is one which generates gas when in use, and most electrochemical systems used in batteries do generate gas, this will supply the necessary gas, but if the system is one which does not generate gas, a small quantity of a substance or material which will generate gas when in contact with the electrolyte may be secured in the headspace.

It will be observed that in the definition just given there is a reference to a headspace above the space for the active materials. This implies that the container in use must be oriented in relation to the vertical. The disposition of the parts of the battery will ensure this and if need be the container can be weighted.

The vent may be provided with a mechanical closure which is held open while the cell or battery is in store, but which by the action of the electrolyte when immersed allows the closure to operate after a sufficient interval to ensure filling and also allows the release of any excess gas pressure during operation. Thus a valve, for instance in the form of a simple cap or disc, may be carried by a spring arm which urges it into the closed position, the arm being held in the open position by the lodging under it of a pellet of some substance which is dissolved or disrupted by the electrolyte. After immersion, the pellet dissolves or is disrupted and allows the arm to close the valve down on to the end of the vent. By suitable selection of the material and size of the pellet, any desired period can be obtained from immersion to closing. Thus if rapid action is required, it may be a firmly compressed pellet of a mixture of particles of a substance such as bentonite, which rapidly swells in contact with water, with particles of any other substance which will give a stable, firm, non-hygroscopic pellet. If slower action is required, a stable, non-hygroscopic substance such as lump sugar is suitable.

Instead of employing a mechanical valve, the vents may be arranged so that gas is trapped in them. It would be possible to make one vent of one type and the other of the other type, or to use a gas trap and mechanical closure in series, but such complications are usually unnecessary.

A convenient form of vent which will automatically trap gas is an inverted U and at least one of the vents may be in this form, one limb of the U opening into the upper part of the interior of the container while the other limb opens outside the container. If the electrochemical system does not generate gas or if there is any risk of gas not being formed with sufficient rapidity, any vent which is made of inverted U form can have secured therein a small quantity of a substance or mixture which will react with electrolyte to produce an initial bubble of gas to lie in the inverted U portion of the vent. The outflow vent may comprise a narrow aperture opening upwards out of a chamber of larger cross-section, so that outflow through it can only take place under a pressure a little higher than the hydrostatic pressure reigning outside, so that in operation gas is trapped in this vent during the original filling of the cell but any gas generated during operation can force its way out as soon as its pressure rises by the small amount necessary. As soon as the pressure drops to that of the hydrostatic pressure outflow ceases and gas simply remains trapped. Alternatively, the outlet may be a passage closed by means which permits the free outflow of gas from the container until it is filled with electrolyte, when the means—which may be a porous diaphragm of bonded fibre fabric or filter paper—once wetted by the electrolyte, becomes substantially impermeable to the flow of gas.

The invention will be described further with reference to the accompanying drawings, in which:

Figure 1 is a front elevation of part of a battery embodying a container according to the present invention.

Figures 2 and 3 are sections of Figure 1 on the lines II—II and III—III respectively.

Figure 4 shows certain modifications of Figure 1.

Figure 5 is a diagrammatic longitudinal section of another form of battery incorporating a container according to the invention.

Figure 6 is a detail showing a modification of Figure 4.

Figure 7 is a longitudinal section of a third form of battery embodying a container according to the invention and Figure 8 is an end view.

Referring first to the embodiment shown in Figures 1 to 3, the battery comprises a plurality of substantially identical elements which are open-sided, the elements being assembled together to form a plurality of cells. It will be understood that when assembled each element must be hermetically sealed to the next element. Conveniently each element slightly overlaps the next as at 11 and locating shoulders are provided at 12. In this way the elements are held parallel with one another and at a definite spacing.

Each cell has two vents, one serving as an outlet and the other as an inlet. Desirably the outlet vent is at a slightly higher level, as this helps to ensure that when the container is immersed the air is displaced out of the upper vent and the electrolyte enters through the lower vent. In this form of the invention the upper vent 13 is a narrow aperture opening upwards out of a chamber 14 of larger cross-section which communicates directly with the interior of the cell. By suitable choice of the dimensions of the aperture 13 and of the chamber 14, it can be arranged that outflow can only take place under a pressure a little higher than the hydrostatic pressure reigning outside, so that in operation, air is trapped here during the original filling of the cell but gas generated during operation can force its way out as soon as its pressure rises by the small amount necessary. Where the electrolyte is water or an aqueous solution, the vent 13 may have a bore not greater than 0.04 inch (1 mm.) diameter and the chamber 14 from which it opens, a cross-section not less than the equivalent of 0.2 inch (5 mm.) diameter.

In this example, the lower vent through which the cell is filled is an inverted U passage 15, the apex of which is appreciably lower than the vent 13. As shown in Figure 1, the vent 15 simply communicates with the interior of the cell but as shown in Figure 4, it may continue down to any desired level therein. In either case, provided the electrochemical system used is one which generates a fair amount of gas in operation, sufficient gas will soon be trapped in the U bend to isolate the electrolyte here, but if desired a small quantity of a suitable substance or mixture may be secured in the vent to react when the electrolyte reaches it to produce an initial bubble of gas to lie in the inverted U portion 15 of the vent.

When the cell is immersed the electrolyte enters the lower vent 15 and gas escapes from the upper vent 13 until the cell is substantially filled with electrolyte. Since a positive pressure is required to force gas out through the upper vent into the surrounding electrolyte the cell will not quite fill and a small bubble of gas will remain in the upper vent.

Whilst the cell is in use the gas generated will not only force its way out of the upper vent 13, but if the lower vent 15 opens below the liquid level e.g. if it continues down to the lower part of the cell as in Figure 4 and the evolution of gas is faster than the upper vent 13 can pass at an adequate rate, electrolyte will be forced out of the cell through the lower vent 15. This will automatically reduce the rate of evolution of gas and when the rate falls still further electrolyte will re-enter the cell through the lower vent 15 to restore the level.

Instead of a simple narrow aperture 13 opening upwards out of a chamber 14 of larger cross-section, the upper vent may also be an inverted U passage, as shown at 16 in Figure 4. Here again a certain excess pressure will be necessary before gas can force its way out and this excess pressure will be determined by the vertical distance 17 between the highest point of the final outlet and the lowest point 19 of the bend.

For use with sea water or fresh water the known systems comprising silver chloride and magnesium electrodes, or cuprous chloride and magnesium electrodes, or mercuric chloride and magnesium electrodes, may be used. For the case of silver chloride the electrode may be made by clamping together a sheet of silver chloride and a piece of thin silver foil. Heat is applied to the foil until the chloride partially melts and adheres to the foil. In the case of cuprous chloride the invention provides a construction in which the copper chloride is held in the form of cake 21 in a shallow tray or cup 22 of copper or brass, the cake being produced by compressing granules of the material under a pressure of many tons per square inch, or by melting and casting the material. A small proportion of graphite, carbon black, copper powder, clippings of fine copper wire or copper gauze is desirably incorporated to lower the resistance.

Where the electrodes of adjacent cells are to be connected in series as in Figures 1 to 3 a magnesium plate 24 forming one electrode of one cell may be copper plated upon one side and soft soldered to the tray 22 containing the cuprous chloride electrode of the adjacent cell. Similarly in the case of silver chloride, the magnesium plate may be soldered to the silver foil above mentioned. The combined electrodes may then be made a part of the wall 25 between adjacent cells so that the interconnections are within the cell containers.

The elements from which the cells are formed may be plastic mouldings of material such as polyvinyl chloride, polymethylmethacrylate, polystyrene or cellulose esters or any other insulating materials which can easily be cemented. The combined electrodes may be moulded or cemented into the wall 25 which will form the division between adjacent cells, the chambers and vents may, as shown in the figures, be formed as channels in a surface which will be cemented to an adjacent container wall. As above mentioned, elements may be socketed on one side to receive a part of the next container, thus facilitating assembly and strengthening it.

Material to produce an initial gas bubble in the inverted U of the lower vent 15 may be a pellet of sodium bicarbonate and tartaric or citric acid, and it may be secured in position by a spot of adhesive. When the lower vent communicates directly with the upper part of the interior of the cell, as in Figure 1, the gas seal will very soon be formed, however, without the provision of material specially to produce an initial gas bubble.

Cells constructed as in Figures 1 to 3, when functioning normally immersed in an electrolyte such as sea water show a resistance from inside to outside of the cell of from 6,000 to 25,000 ohms, which is adequate to reduce leakage to a value acceptable for many purposes.

In the examples shown in the remaining figures, a plurality of cells are included within a common container which is provided with two (or more) vents which will allow the container to fill with electrolyte and during the operation of the battery maintain the electrolyte within the container isolated from the electrolyte in which the container is immersed without preventing the initial filling of the container with electrolyte. The container is subdivided into cells by internal walls which are apertured to allow electrolyte to pass into all of the cells as the casing fills, the apertures being located in a head-space above the normal electrolyte level of the cells under operating conditions whereby adjacent cells remain isolated from one another under operating conditions.

Thus in the examples shown in Figures 5 and 6 a container 31 is internally sub-divided by walls 32 into cells. Two vents are provided at opposite ends, one 33 serving as an inlet and the other 34 as an outlet; the open end of the vent 34 is arranged above the level of the entrance to the vent 33 so that when the battery is immersed, the electrolyte enters through the inlet 33, displacing air through the vent 34. The outlet is arranged to operate in conjunction with a means which permits the free passage of air expelled by the incoming electrolyte, and at the same time prevents electrolyte from entering through the outlet tube until such a time as the battery has filled with electrolyte, when the said means becomes impermeable or substantially impermeable to the flow of the gas generated within the cell on discharge. In this condition, gas normally evolved by the reactions occurring during the discharge of the battery is expelled through the other vent, that is the inlet, and in doing so reduces the level of the electrolyte within the battery below apertures 35 in the intercell dividing walls 32, thereby ensuring substantial isolation of individual cells. By this system, the initial filling of electrolyte through the inlet must suffice for the complete discharge of the battery and by choosing suitable dimensions and design of the cell components, in particular by providing ample headspace and locating the apertures 35 well above the electrode system 37, 38, this is found to be feasible and any losses due to the tilting of the battery can be minimised. It has been found that loss in electrical performance due to possible momentary interconnection of adjacent cells as a result of tilting of the battery, is not of any serious consequence. The proportions illustrated in the drawings are typical of what is satisfactory. It will be understood that any filling of electrolyte will provide for a discharge from the battery and the choice of the dimensions and design of the cell components is a matter of making the size of this component such that there will not be any great excess of consumable materials left when the activity of the electrolyte is exhausted. Suitable figures can readily be calculated by those skilled in the art from the volume of the container and the properties of the cell components. The components and the construction of the electrode system may be the same as those described above with reference to Figures 1 to 3.

In effect the inlet is of inverted U form and substantial electrical insulation of the battery from the surrounding electrolyte is achieved by suitable dimensioning of the vent, so that the gas being expelled from the battery forms sufficiently large bubbles to ensure discontinuity between the electrolyte within the battery and the common electrolyte surrounding it.

In Figure 5, the outlet vent 34 for the escape of air as the container fills is a tube extending from the upper region of the container upwardly from the container. This is closed within the container by a porous diaphragm 39 arranged vertically within a chamber 41 which being part of the container is of insulating material. This insulating chamber has an aperture 42 in the wall 43 dividing the chamber from the cell, located at substantially the same level as the apertures 35. The outlet vent 34 in this example opens directly out of the chamber 41.

The material from which the porous diaphragm 39 is made is selected so that the diaphragm is gas-pervious when dry, but becomes impervious to gases when wet; thus it may be of filter paper or preferably bonded fibre fabric which is stronger and passes air more rapidly. Thus air can escape through diaphragm 39 and the outlet vent 34 during the initial filling of the container. The container fills from the inlet end to the outlet end and finally the chamber also fills with electrolyte, thus wetting the diaphragm 39 and closing the outlet to the further escape of gas. In some instances the chamber may fill right up. During subsequent discharge of the cells, the gas given off is sufficient to force the electrolyte out of the inlet vent 33 and lower the level of electrolyte within the insulated chamber on the cell side of the diaphragm adjacent the cells, below the level of the apertures 35, 42, so that the electrolyte within each cell is isolated and is also isolated from that within the chamber 41, and finally is isolated at the vent 33 from the electrolyte outside the container.

There is a possibility, when the battery is first immersed, of some electrolyte getting in through the outlet vent 34 and wetting the diaphragm 39, thus preventing the battery from filling, because the air can no longer escape through the diaphragm. To avoid this, a protecting screen 44 may be provided of a material which will permit the passage of gas but not of liquid. This screen, being between the diaphragm 39 and the vent 34, ensures that the diaphragm can only be wetted by electrolyte which gets to it through the container. Materials which have the necessary properties are well known and are used, for example, for rainproof clothing which does not prevent ventilation. They are usually finely woven fabrics impregnated with a material such as silicone fluid which does not fill the pores but which makes the fibres water repellent. Other materials which may be used are porous (unglazed) ceramics, sintered metal bodies, or glass fibre fabric or mats, similarly impregnated.

In the construction shown in Figure 6 (which will have an inlet vent at the other end similar to that in Figure 5) the porous diaphragm has been eliminated. There is still a screen 45 of a material which will allow gas to pass through but not liquid, similar to the screen 44 in Figure 5 and this is arranged at a small spacing from a flat surface 46 formed at the outer end of the vent 34. The vent tube (or the outer end part of it) is of narrow bore. On account of this small spacing, which may be, say, 0.62 inch (1.5 mm.) and this narrow bore, which may be say, 0.1 inch (2.5 mm.), once the electrolyte rises through the vent 34 into this space, a film is retained therein and in the end of the tubular part of the vent by capillarity after gas liberated in the operation of the cell has displaced the electrolyte out of the vent and formed the necessary gas trap. This film of liquid serves to prevent the escape of gas from the vent 34.

In the example shown in Figures 7 and 8, the complete container is made up of individual elements similar to those of Figures 1 to 3. The inlet vent 51 is of inverted U form as in Figure 5 and is formed by a short wall 52 closing the upper end of the end element. The outlet vent employs a porous diaphragm 53 which is sealed when wetted by electrolyte and a protecting screen 54 as in Figure 5, but these are now arranged horizontally in a separate chamber 55 having a short nozzle 56 cemented into the end element of the container. The screen 54 is protected by a wire grid 57.

In the construction shown in Figure 5, although wetting of the diaphragm 39 by the entry of electrolyte through the outlet vent 34 is prevented if the screen 44 is provided, the accidental entry of electrolyte through the outlet vent 34 is not prevented with certainty and if it does enter, the head of pressure by which filling through the inlet is ensured is lost and filling may cease, even though the diaphragm has not been wetted. This risk is avoided in the construction shown in Figures 6 and 7, because the screen 55 which prevents the entry of electrolyte is above the level of the head space of the container.

All the constructions illustrated employ gas traps to isolate the electrolyte inside the container from that outside. As above mentioned, instead or in addition the vents may be provided each with a means such as a valve which automatically closes after the battery has been immersed for a predetermined period.

As above mentioned the same construction of the electrode system may be used in the container constructions of Figures 5 to 8 as in Figures 1 to 3. As the ends of the assembly shown in Figures 7 and 8 are open, the electrodes at each end may be sealed over with a suitable material such as pitch, indicated at 58, an insulated lead 59 being brought out through the sealing material. Similar sealing and connecting arrangements may be provided in the other embodiments.

What we claim is:

1. An inert voltaic cell comprising a cell container of insulating material, a dry anode component and a cathode component assembled therein to form when wetted a generator of electric current and of gas, said components occupying the lower part only of said container, said container having an inlet vent and an outlet vent above said inlet vent, said vents communicating with one another through the upper part of said container above said components, said inlet vent being a tunnel of inverted U form, and means permitting egress of gas and preventing ingress of liquid through said outlet vent upon immersion of the cell and preventing discharge of gas through said outlet vent after the cell is filled with electrolyte.

2. An inert battery comprising a container of insulating material having interior walls dividing it into a plurality of cell compartments, an assembly of a dry anode component and a dry cathode component in the lower part of each component constituting when wetted a generator of electric current and of gas, electrical interconnections between the generators so formed, the upper part of said container having an inlet vent and an outlet vent spaced apart in the vertical direction, the outlet vent being the higher of the two and being gas-permeable during filling of the battery, vents opening into opposite ends of said container and all of said interior walls having openings through them above the level of said assemblies, means for hindering ingress of electrolyte through said outlet vent when the battery is immersed and for hindering the discharge of gas through said outlet vent after the container is filled with electrolyte.

3. An inert battery comprising a container of insulating material having interior walls dividing it into a plurality of cell compartments, an assembly of a dry anode component and a dry cathode component in the lower part of each compartment constituting when wetted by an aqueous solution a generator of electric current and of gas, electrical interconnections between the generators so formed, the upper part of said container having an inlet vent of inverted U form and an outlet vent of bore no greater than 0.04 inch spaced apart in the vertical direction, the outlet vent being the higher of the two, said vents opening into opposite ends of the container and all of said interior walls having openings through them above the level of said assemblies.

4. An inert battery comprising a container of insulating material having interior walls dividing it into a plurality of cell compartments, an assembly of a dry anode component and a dry cathode component in the lower part of each compartment constituting when wetted a generator of electric current and of gas, said container having an inlet vent of inverted U form and an outlet vent spaced apart in the vertical direction, the outlet vent being the higher of the two, said vents opening into opposite ends of said container, all of said interior walls having openings through them above the level of said assemblies, means across said outlet vent preventing the discharge of gas through said outlet vent after the container is filled with electrolyte, and a sheet of gas-permeable liquid-repellent material closing said outlet vent outside said discharge preventing means.

5. An inert battery comprising a container of insulating material having interior walls dividing it into a plurality of cell compartments, an assembly of a dry anode component and a dry cathode component in the lower part of each compartment constituting when wetted a generator of electric current and of gas, said container having an inlet vent of inverted U form and an outlet vent spaced apart in the vertical direction, the outlet vent being the higher of the two, said vents opening into opposite ends of said container, all of said interior walls having openings through them above the level of said assemblies, a first sheet of gas-permeable, water-repellant material closing said outlet vent, and a sheet of porous, water-absorbing material gas-permeable only when dry closing said outlet vent between said first sheet and the interior of the container.

6. An inert battery comprising a container of insulating material having internal walls dividing it into a plurality of cell compartments, an assembly of a dry anode component and a dry cathode component in the lower part of each compartment constituting when wetted a generator of electric current and of gas, electrical interconnections between the generators so formed and all of said interior walls having openings through them above the level of said assemblies, said container having an inlet passage at one end leading upward to the opening of an interior wall at that end thereby forming an inverted U-form passage in the bend of which gas may be trapped, said container having at the other end an outlet vent from the upper part of the container at a higher level than said inlet passage, means for retaining by capillarity a layer of electrolyte across said outlet vent after the container is filled with electrolyte whereby to prevent discharge of gas through said outlet vent, and means for preventing access of liquid to said retaining means, from outside the container upon immersion of the container in a liquid.

7. An inert voltaic cell as set forth in claim 1 wherein said outlet is obstructed by a body of porous material permeable to gas when dry having pores small enough to retain liquid when wet thereby becoming impermeable to gas and said body is covered by a layer of porous, liquid repellent material.

8. An inert voltaic cell comprising a container of insulating material, a dry anode component and a dry cathode component assembled therein to form when immersed in a suitable liquid a generator of electric current and gas, said components occupying the lower part only of said container, said container having an inlet vent communicating with the upper part of the interior of the container and made of inverted U shape to trap gas at a level above that occupied by said components and having an outlet vent communicating with the upper part of the interior of the container and opening outside the container at a higher level than the entrance to the inlet vent, an obstruction in said outlet vent which has fine passages through it so that when dry it is permeable to gas but the passages which are so small that when the obstruction is wetted it retains by capillarity a layer of liquid which will prevent the passage of gas at the pressure normally developed in the operation of the battery, and a partition across said outlet vent on the outside of said obstruction of a material which is porous and therefore permeable to gas but which is liquid repellent and therefore not permeable to liquid.

9. An inert voltaic cell as set forth in claim 8 wherein said obstruction and said partition comprise a pair of substantially parallel closely spaced walls.

10. An inert voltaic cell as set forth in claim 8 wherein said obstruction is a sheet of filter paper.

11. An inert voltaic cell as set forth in claim 8 wherein said obstruction is a sheet of bonded fibre fabric.

12. An inert voltaic cell as set forth in claim 8 in which said partition is of finely woven fabric impregnated with silicone fluid which does not fill the pores but makes the fibres water repellent.

13. An inert voltaic cell comprising a container of insulating material having vertical internal walls dividing the upper part of it into a plurality of compartments, said walls having aligned head space openings at their upper ends, an assembly of a dry anode component and a dry cathode component electrically in contact and continuing each internal wall except the two end walls downwardly to the bottom of the container and so completing the division of the container into cell compartments, the assemblies all being directed the same way, insulation continuing the two end internal walls downwardly to the bottom of the container and so completing the two end cell compartments, a dry anode component and a dry cathode component disposed one in one end cell compartment and the other in the other to complete the sequence of components, an external wall at one end extending from the top of the container downwardly to a level well below said head space openings, said external wall being spaced from the internal wall at that end and forming with the head space opening in that internal wall an inlet passage of inverted U form, an outlet vent above the level of said passage connecting with the head space opening at the opposite end to said inlet passage, and two sheets across said outlet vent, the sheet nearer the interior of the container being gas-permeable when dry and gas-impermeable when wet and the sheet further from the interior of the container being of a gas-permeable, water-repellent material.

14. An inert voltaic cell as set forth in claim 13 wherein said outlet vent is located above the top of the container and said two sheets are horizontally disposed.

References Cited in the file of this patent

UNITED STATES PATENTS

| | | |
|---|---|---|
| 1,210,787 | Ford | Jan. 2, 1917 |
| 2,322,210 | Adams | June 22, 1943 |
| 2,594,879 | Davis | Apr. 29, 1952 |
| 2,655,551 | Ellis | Oct. 13, 1953 |
| 2,684,988 | Wilburn | July 27, 1954 |
| 2,711,437 | Wilke | June 21, 1955 |
| 2,781,413 | Luening | Feb. 12, 1957 |
| 2,806,895 | Dines | Sept. 17, 1957 |
| 2,852,593 | Chubb et al. | Sept. 16, 1958 |